US012220764B2

(12) United States Patent
Pelaprat et al.

(10) Patent No.: US 12,220,764 B2
(45) Date of Patent: Feb. 11, 2025

(54) VISIBLE LASER WELDING OF ELECTRONIC PACKAGING, AUTOMOTIVE ELECTRICS, BATTERY AND OTHER COMPONENTS

(71) Applicant: NUBURU, INC., Centennial, CO (US)

(72) Inventors: Jean Michel Pelaprat, Oak Park, IL (US); Mark S. Zediker, Castle Rock, CO (US); Mathew Finuf, Parker, CO (US)

(73) Assignee: Nuburu, Inc., Centennial, CO (US)

( * ) Notice: Subject to any disclaimer, the term of this patent is extended or adjusted under 35 U.S.C. 154(b) by 949 days.

(21) Appl. No.: 15/581,928

(22) Filed: Apr. 28, 2017

(65) Prior Publication Data

US 2017/0341144 A1    Nov. 30, 2017

Related U.S. Application Data

(60) Provisional application No. 62/329,830, filed on Apr. 29, 2016.

(51) Int. Cl.
| | |
|---|---|
| B23K 26/06 | (2014.01) |
| B22F 10/36 | (2021.01) |
| B23K 26/08 | (2014.01) |
| B23K 26/082 | (2014.01) |
| B23K 26/14 | (2014.01) |
| B23K 26/22 | (2006.01) |

(Continued)

(52) U.S. Cl.
CPC ............. *B23K 26/14* (2013.01); *B22F 10/36* (2021.01); *B23K 26/0648* (2013.01); *B23K 26/0665* (2013.01); *B23K 26/082* (2015.10); *B23K 26/0876* (2013.01); *B23K 26/22* (2013.01); *B23K 26/244* (2015.10); *B23K 26/323* (2015.10); *B23K 26/702* (2015.10); *B22F 10/25* (2021.01); *B22F 12/22* (2021.01); *B22F 12/44* (2021.01); *B23K 26/32* (2013.01); *B23K 2101/36* (2018.08); *B23K 2103/04* (2018.08); *B23K 2103/10* (2018.08); *B23K 2103/12* (2018.08); *B23K 2103/18* (2018.08); *B23K 2103/42* (2018.08)

(58) Field of Classification Search
CPC ............ B23K 26/0648; B23K 26/0665; B23K 26/14; B23K 26/082; B23K 26/244; B23K 26/702; B23K 26/323; B23K 26/22; B23K 26/0876; B23K 2101/36; B23K 2103/12; B23K 2103/42; B23K 26/32; B23K 2103/10; B23K 2103/04; B23K 2103/18; B22F 3/1055; B22F 2003/1057
USPC ...................................... 219/121.64
See application file for complete search history.

(56) References Cited

U.S. PATENT DOCUMENTS

| | | | | |
|---|---|---|---|---|
| 3,402,254 A | * | 9/1968 | Parker ................ | H01B 5/02 |
| | | | | 428/595 |
| 3,935,417 A | * | 1/1976 | Umino ................ | B23K 35/004 |
| | | | | 219/121.14 |

(Continued)

OTHER PUBLICATIONS

PCT, Search Report Report PCT/US2017/030175, Jul. 13, 2017.

*Primary Examiner* — Eric S Stapleton
(74) *Attorney, Agent, or Firm* — Glen P. Belvis; Belvis Law, LLC.

(57) ABSTRACT

A visible light laser system and operation for welding materials together. A blue laser system and operation for welding conductive elements, and in particular thin conductive elements, together for use in energy storage devices, such as battery packs.

24 Claims, 5 Drawing Sheets

(51) Int. Cl.
*B23K 26/244* (2014.01)
*B23K 26/32* (2014.01)
*B23K 26/323* (2014.01)
*B23K 26/70* (2014.01)
*B22F 10/25* (2021.01)
*B22F 12/00* (2021.01)
*B22F 12/44* (2021.01)
*B23K 101/36* (2006.01)
*B23K 103/00* (2006.01)
*B23K 103/04* (2006.01)
*B23K 103/10* (2006.01)
*B23K 103/12* (2006.01)
*B23K 103/18* (2006.01)

(56) References Cited

U.S. PATENT DOCUMENTS

| | | | | |
|---|---|---|---|---|
| 4,185,185 A * | 1/1980 | Adlam | | B23K 26/08 219/121.64 |
| 4,187,408 A * | 2/1980 | Heile | | B23K 26/08 219/121.64 |
| 4,288,678 A * | 9/1981 | La Rocca | | B23K 26/0643 219/121.65 |
| 4,679,198 A * | 7/1987 | Shone | | C30B 29/32 372/40 |
| 4,697,061 A * | 9/1987 | Spaeter | | B23K 26/18 219/121.64 |
| 4,857,699 A * | 8/1989 | Duley | | B23Q 35/128 219/121.85 |
| 4,879,449 A * | 11/1989 | Duley | | B23Q 35/128 219/121.6 |
| 4,960,973 A * | 10/1990 | Fouche | | B23K 26/60 219/121.64 |
| 5,027,360 A * | 6/1991 | Nabors | | H01S 3/10092 372/18 |
| 5,085,122 A * | 2/1992 | Berlam | | F41F 3/10 114/238 |
| 5,124,973 A * | 6/1992 | Igata | | G11B 7/0956 369/44.32 |
| 5,129,884 A * | 7/1992 | Dysarz | | A61M 25/0606 604/164.08 |
| 5,234,150 A * | 8/1993 | Yamamoto | | B23K 20/04 228/158 |
| 5,393,482 A * | 2/1995 | Benda | | B22F 3/1055 419/1 |
| 5,500,503 A * | 3/1996 | Pernicka | | B23K 26/24 219/121.63 |
| 5,502,292 A * | 3/1996 | Pernicka | | B23K 26/24 219/121.63 |
| 5,517,059 A * | 5/1996 | Eytcheson | | B23K 26/702 219/121.13 |
| 5,578,227 A * | 11/1996 | Rabinovich | | B23K 26/324 219/121.63 |
| 5,874,708 A * | 2/1999 | Kinsman | | B23K 26/034 219/121.64 |
| 5,940,037 A * | 8/1999 | Kellerman | | H01Q 9/0414 343/700 MS |
| 5,942,135 A * | 8/1999 | Rau | | B22F 7/004 219/117.1 |
| 5,987,043 A * | 11/1999 | Brown | | H01S 5/02252 347/237 |
| 6,060,685 A * | 5/2000 | Chou | | B23K 26/032 219/121.83 |
| 6,114,185 A * | 9/2000 | Tsuzuki | | H01L 31/18 438/51 |
| 6,172,327 B1 * | 1/2001 | Aleshin | | B23K 26/032 219/121.64 |
| 6,326,585 B1 * | 12/2001 | Aleshin | | B23K 26/032 219/121.63 |
| 6,984,804 B2 * | 1/2006 | Takeyama | | H01L 31/0504 219/121.64 |
| 7,034,992 B2 * | 4/2006 | Komine | | G02B 6/02042 359/334 |
| 8,430,699 B2 * | 4/2013 | Ishida | | H01R 4/029 439/874 |
| 8,598,523 B2 * | 12/2013 | Stecker | | B22F 3/1055 250/307 |
| 2002/0142184 A1 * | 10/2002 | Mazumder | | B23K 26/32 428/594 |
| 2002/0149137 A1 * | 10/2002 | Jang | | B29C 64/165 264/494 |
| 2003/0063631 A1 * | 4/2003 | Corcoran | | H01S 5/4062 372/18 |
| 2004/0069754 A1 * | 4/2004 | Bates | | B23K 26/244 219/121.63 |
| 2004/0094527 A1 * | 5/2004 | Bourne | | G02B 6/132 219/121.85 |
| 2004/0173587 A1 * | 9/2004 | Musselman | | B23K 26/0093 219/121.64 |
| 2004/0182835 A1 * | 9/2004 | Hall | | B23K 35/3053 219/121.64 |
| 2004/0226919 A1 * | 11/2004 | Beisswenger | | C01B 3/505 219/67 |
| 2004/0232119 A1 * | 11/2004 | Olowinsky | | B23K 26/24 219/121.64 |
| 2004/0254474 A1 * | 12/2004 | Seibel | | A61B 5/0066 600/473 |
| 2005/0103760 A1 * | 5/2005 | Kaplan | | B44B 7/007 219/121.68 |
| 2006/0065639 A1 * | 3/2006 | Musselman | | B23K 25/00 219/121.14 |
| 2006/0160332 A1 * | 7/2006 | Gu | | B23K 26/0622 438/463 |
| 2006/0207976 A1 * | 9/2006 | Bovatsek | | C03B 33/0222 219/121.69 |
| 2007/0051706 A1 * | 3/2007 | Bovatsek | | B23K 26/0624 219/121.69 |
| 2007/0170158 A1 * | 7/2007 | Greig | | B23K 26/244 219/121.64 |
| 2007/0199926 A1 * | 8/2007 | Watanabe | | H05K 3/328 219/121.64 |
| 2008/0035615 A1 * | 2/2008 | Li | | B23K 26/211 219/121.63 |
| 2009/0190218 A1 * | 7/2009 | Govorkov | | G02B 19/0028 359/489.08 |
| 2009/0236321 A1 * | 9/2009 | Hayashi | | H01R 4/029 219/121.64 |
| 2009/0283505 A1 * | 11/2009 | Naumovski | | C10M 169/04 219/121.64 |
| 2010/0176095 A1 * | 7/2010 | Chen | | B23K 35/001 219/118 |
| 2010/0224468 A1 * | 9/2010 | Matsuhashi | | B29C 65/1635 200/293 |
| 2010/0261011 A1 * | 10/2010 | Kuster | | B23K 26/26 428/336 |
| 2010/0270275 A1 * | 10/2010 | Nakamae | | B23K 26/009 219/121.64 |
| 2011/0095003 A1 * | 4/2011 | Sakurai | | B23K 1/0056 219/121.64 |
| 2011/0104566 A1 * | 5/2011 | Byun | | B23K 20/122 429/211 |
| 2011/0117420 A1 * | 5/2011 | Kim | | B23K 10/02 429/158 |
| 2011/0122482 A1 * | 5/2011 | Mead | | H01S 3/0675 359/327 |
| 2011/0129615 A1 * | 6/2011 | Renn | | C23C 18/143 427/555 |
| 2011/0188927 A1 * | 8/2011 | Mizrahi | | F16B 5/08 403/271 |
| 2011/0195296 A1 * | 8/2011 | Kim | | H01M 2/202 429/151 |
| 2011/0216792 A1 * | 9/2011 | Chann | | G02B 19/009 372/31 |
| 2011/0259862 A1 * | 10/2011 | Scott | | B23K 26/082 219/121.73 |
| 2011/0267671 A1 * | 11/2011 | Peng | | H01S 3/115 359/257 |

(56) References Cited

U.S. PATENT DOCUMENTS

| | | | |
|---|---|---|---|
| 2011/0311389 A1* | 12/2011 | Ryan | F01D 5/18 419/27 |
| 2012/0012570 A1* | 1/2012 | Briand | B23K 26/1436 219/121.72 |
| 2012/0020631 A1* | 1/2012 | Rinzler | G02B 6/443 385/109 |
| 2012/0058374 A1* | 3/2012 | Aota | H01M 10/0431 429/94 |
| 2012/0241420 A1* | 9/2012 | Ishikawa | B23K 26/211 219/121.13 |
| 2012/0241422 A1* | 9/2012 | Cai | B23K 26/244 219/121.14 |
| 2012/0244416 A1* | 9/2012 | Cai | H01M 2/26 429/160 |
| 2012/0285936 A1* | 11/2012 | Urashima | G01B 9/02069 219/121.63 |
| 2013/0071738 A1* | 3/2013 | Wang | B23K 26/20 429/211 |
| 2013/0072075 A1* | 3/2013 | Kayamoto | C23C 24/04 439/887 |
| 2013/0148673 A1* | 6/2013 | Creeden | H01S 3/09408 372/6 |
| 2013/0162952 A1* | 6/2013 | Lippey | G02B 27/48 353/7 |
| 2013/0269748 A1* | 10/2013 | Wiedeman | H01L 31/1876 136/244 |
| 2014/0008335 A1* | 1/2014 | Yao | B23K 26/323 219/121.64 |
| 2014/0023098 A1* | 1/2014 | Clarkson | H01S 3/07 372/3 |
| 2014/0086539 A1* | 3/2014 | Goutain | H01S 5/34333 385/89 |
| 2014/0147722 A1* | 5/2014 | Doornpekamp | H01M 2/204 429/121 |
| 2014/0305910 A1* | 10/2014 | Gapontsev | B23K 26/244 219/74 |
| 2015/0048068 A1* | 2/2015 | Matsushita | H01L 24/40 219/121.64 |
| 2015/0136840 A1* | 5/2015 | Zhao | B23K 26/244 228/160 |
| 2015/0246412 A1* | 9/2015 | Mendes | B23K 26/0006 219/121.71 |
| 2015/0314393 A1* | 11/2015 | Woo | B23K 26/26 428/615 |
| 2015/0357723 A1* | 12/2015 | Tachibana | H01R 13/03 439/878 |
| 2016/0114429 A1* | 4/2016 | Shioga | B23K 26/0006 219/121.66 |
| 2016/0121421 A1* | 5/2016 | Uhm | B23K 9/23 310/216.004 |
| 2016/0151853 A1* | 6/2016 | Lee | B23K 20/2336 219/137 R |
| 2016/0228974 A1* | 8/2016 | Lam | B23K 11/31 |
| 2017/0028515 A1* | 2/2017 | De Souza | B23K 26/244 |

* cited by examiner

VISIBLE LASER WELDING OF ELECTRONIC PACKAGING, AUTOMOTIVE ELECTRICS, BATTERY AND OTHER COMPONENTS

This application claims under 35 U.S.C. § 119(e)(1) the benefit of the filing date of U.S. provisional application Ser. No. 62/329,830 filed Apr. 29, 2016, the entire disclosure of which is incorporated herein by reference.

BACKGROUND OF THE INVENTION

Field of the Invention

The present inventions relate to laser processing of materials and in particular laser joining of materials using laser beams having wavelengths from about 350 nm to about 500 nm and greater.

Welding the buss bars, interconnects, electrodes, battery cells, battery packs, and tabs and casings on the next generation of batteries and energy storage systems requires a robust means to produce a low resistance, high fatigue cycle joint between copper, aluminum, stainless steel ("SS") and nickel plated materials. Conventional lasers in the IR wavelengths, e.g., greater than 700 nm, and particularly greater than 1,000 nm wavelengths, are unable to weld or to provide a consistent high quality weld of these materials because of the low absorptivity of the material in those wavelengths. As a consequence, either a very high power laser is needed to start the process, or a very high brightness laser is needed to conduct the process, sometimes both lasers are required. Thus, both of these prior options, i.e., high brightness or high power, lead to narrow processing windows, which are undesirable and result in difficulties including lack of repeatability, difficulty in controlling the operation, and difficulty in scaling the operation to provide welds and products to the high tolerances and great uniformity that are ever increasingly being required in the buss, battery, energy storage, aerospace, automotive, solar, photovoltaic, and electric power fields, including electronics packaging, and component related fields.

The terms "laser processing, "laser processing of materials," and similar such terms, unless expressly provided otherwise, should be given there broadest possible meaning and would include welding, soldering, smelting, joining, annealing, softening, tackifying, resurfacing, peening, thermally treating, fusing, sealing, and stacking.

As used herein, unless expressly stated otherwise, "UV", "ultra violet", "UV spectrum", and "UV portion of the spectrum" and similar terms, should be given their broadest meaning, and would include light in the wavelengths of from about 10 nm to about 400 nm, and from 10 nm to 400 nm.

As used herein, unless expressly stated otherwise, the terms "visible", "visible spectrum", and "visible portion of the spectrum" and similar terms, should be given their broadest meaning, and would include light in the wavelengths of from about 380 nm to about 750 nm, and 400 nm to 700 nm.

As used herein, unless expressly stated otherwise, the terms "blue laser beams", "blue lasers" and "blue" should be given their broadest meaning, and in general refer to systems that provide laser beams, laser beams, laser sources, e.g., lasers and diodes lasers, that provide, e.g., propagate, a laser beam, or light having a wavelength from about 400 nm to about 500 nm.

As used herein, unless expressly stated otherwise, the terms "green laser beams", "green lasers" and "green" should be given their broadest meaning, and in general refer to systems that provide laser beams, laser beams, laser sources, e.g., lasers and diodes lasers, that provide, e.g., propagate, a laser beam, or light having a wavelength from about 500 nm to about 575 nm.

Generally, the term "about" as used herein, unless specified otherwise, is meant to encompass a variance or range of ±10%, the experimental or instrument error associated with obtaining the stated value, and preferably the larger of these.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There has been a long standing and unfulfilled need for greater reproducibility, reliability, high tolerances and more robustness in the fabrication of high reflectivity component parts, electronic connectors, electronics, electronic components and, in particular, the fabrication of buss bars, interconnects, and tabs. The present inventions, among other things, solve these needs by providing the articles of manufacture, devices and processes taught, and disclosed herein.

Thus, there is provided a method of welding to pieces of metal together, the method having: associating a first piece of metal with a second piece of metal; directing a laser beam toward the first and second pieces of metal; wherein the laser beam has a wavelength in the range of about 400 nm to about 500 nm; wherein the pieces of metal absorb from about 40% to about 75% of the laser beam; and, whereby the pieces are welding together.

There is further provided these methods, systems and apparatus having one or more of the following features: wherein the first piece is a foil having a thickness of from about 5 μm to about 100 μm; wherein the second piece is a foil having a thickness of from about 5 μm to about 100 μm; wherein the first piece of material is has a metal selected from the group consisting of copper, copper alloys, gold, gold alloys and stainless steel.

Moreover, there is provided a method of welding to pieces of metal together, the method having: associating a first piece of metal with a second piece of metal; directing a laser beam toward the first and second pieces of metal; wherein the laser beam has a wavelength in the range of about 400 nm to about 500 nm; wherein the first piece of metal has aluminum; and, whereby the pieces are welding together.

There is further provided these methods, systems and apparatus having one or more of the following features: wherein the second piece of metal has aluminum; wherein the first piece of metal is an aluminum alloy; wherein the first piece, the second piece or both pieces, are a foil having a thickness of from about 5 μm to about 100 μm; wherein the first piece, the second piece or both pieces, are a tab having a thickness from about 50 μm to about 500 μm; wherein the second piece has copper; wherein the second piece is a tab having a thickness from about 50 μm to about 500 μm; and wherein the tab is made a material selected form the group consisting of copper and copper alloys; wherein the second piece of metal is selected from the group consisting of nickel plated materials, nickel plated copper, nickel plated aluminum, nickel plated copper alloys, nickel plated aluminum alloys, and stainless steel; wherein the second piece of metal is a buss bar; wherein the second piece of metal is selected from the group consisting of an aluminum buss bar, an aluminum alloy buss bar, a copper tab, a copper alloy tab, a nickel plated copper buss bar, a nickel plated copper alloy buss bar, a nickel plated aluminum bus bar, and a nickel plated aluminum alloy buss bar; and, wherein the second piece of metal is selected from the group of consisting of materials electroplated with gold, materials electroplated with platinum, and materials electroplated with copper.

Furthermore there is provided a method of joining two metal components, using a blue laser beam, the method having: providing a source of a laser beam having a predetermined wavelength to a target location, the target location including a first component to be joined and a second component to be joined; providing scanning devices and focusing optics so that the laser beam can be directed in a pattern and at a predetermined laser intensity; the laser beam and at least one of the first or second components having an absorptivity that is at least about 45%; delivering the laser beam to the target location to weld the first and second components together, wherein at least 45% of the laser beam energy is utilized to form the weld; and, wherein the weld has a resistivity of about 0.1 mΩ to about 250 mΩ.

There is further provided these methods, systems and apparatus having one or more of the following features: wherein the resistivity is from about 0.1 mΩ to about 200 mΩ; wherein the resistivity is less than about 150 mΩ; wherein the resistivity is less than about 100 mΩ; wherein the resistivity is less than about 10 mΩ; wherein the resistivity is less than about 1 mΩ; wherein the scanning device moves the laser beam; wherein the scanning device moves the first and second components, thus the scanning device can move the laser beam, or is can be a table, robot or other mechanical, electric or pneumatic device that moves the piece to be welded in a predetermined manner with respect to the laser beam; wherein the fluence of the laser beam at the spot on the first, the second, or both components is less than about 1,000,000 W/cm$^2$; wherein the fluence of the laser beam at the spot on the first, the second, or both components is less than about 500,000 W/cm$^2$; wherein the fluence of the laser beam at the spot on the first, the second, or both components is less than about 100,000 W/cm$^2$; wherein the fluence of the laser beam at the spot on the first, the second or both components is less than about 50,000 W/cm$^2$; wherein the wavelength is about 400 nm to about 600 nm; wherein the wavelength is about 400 nm to about 500 nm; wherein the wavelength is about 450 nm; wherein the first component and the second component are different metals; wherein the first component and the second component are the same metal; and wherein the first component is selected from the group consisting of gold, copper, silver, aluminum, steel, stainless steel, and alloys of one or more of those metals.

Still further there is provide a method of joining two metal components, using a blue laser beam, wherein the laser intensity at the weld site does not need to be appreciably changed, the method having: providing a source of a laser beam having a predetermined wavelength to a weld site, the weld site including a first component to be joined and a second component to be joined; providing scanning devices and focusing optics so that the laser beam can be directed in a pattern and at a predetermined intensity; delivering the laser beam to the weld site to weld the first and second components together, wherein the intensity remains essentially the same from the starting of the weld through its completion; and, wherein at least 45% of the laser beam energy is utilized to form the weld.

There is further provided these methods, systems and apparatus having one or more of the following features: wherein about 50% of the laser beam energy is utilized to form the weld; wherein about 60% of the laser beam energy is utilized to form the weld; wherein about 65% of the laser beam energy is utilized to form the weld; wherein during the welding of the components the laser beam intensity is capable of varying from about 1% to about 20% during the welding; wherein during the welding of the components the laser beam intensity is capable of varying about 10% during the welding; wherein during the welding of the components the laser beam intensity is capable of varying form about 1% to about 5% during the welding; and, wherein during the welding of the components the laser beam intensity is capable of varying about 1% during the welding.

DESCRIPTION OF THE PREFERRED EMBODIMENTS

Figure 1:
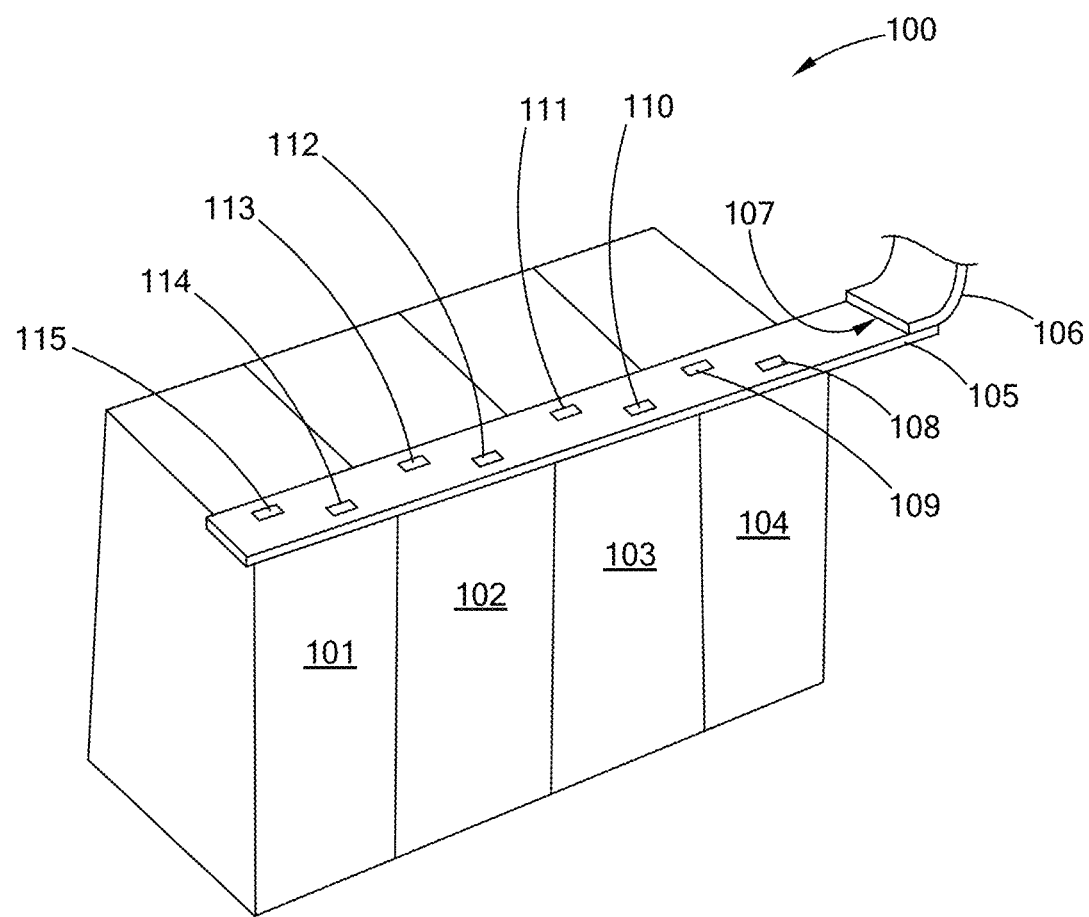
FIG. 1 is a schematic perspective view of an embodiment of a battery pack in accordance with the present inventions.

In general, the present inventions relate to laser processing of materials, laser processing by matching preselected laser beam wavelengths to the material to be processed to have high or increased levels of absorptivity by the materials, and in particular laser welding of materials with laser beams having high absorptivity by the materials.

An embodiment of the present invention relates to using laser beams having visible laser beams, wavelengths from 350 nm to 700 nm, to weld or otherwise join through laser processing, materials that have higher absorptivity for these wavelengths. In particular laser beam wavelengths are predetermined based upon the materials to be laser process to have absorption of at least about 30%, at least about 40%, at least about 50% and at least about 60%, or more and from about 30% to about 65%, from about 35% to 85%, about 80%, about 65%, about 50, and about 40%. Thus, for example, laser beams having wavelengths from about 400 nm to about 500 nm are used to weld gold, copper, brass, silver, aluminum, nickel, alloys of these metals, stainless steel, and other metals, materials, and alloys.

Generally, the term "about" as used herein unless specified otherwise is meant to encompass a variance or range of ±10%, the experimental or instrument error associated with obtaining the stated value, and preferably the larger of these.

The use of a blue laser, e.g., about 405 to about 495 nm wavelength, to weld materials such as gold, copper, brass, silver, aluminum, nickel, nickel plated copper, stainless steel, and other, materials, plated materials and alloys, is preferred because of the high absorptivity of the materials at room temperature, e.g., absorptivities of greater than about 50%. One of several advantages of the present inventions is the ability of a preselected wavelength laser beam, such as the blue laser beam, that is better able to better couple the laser energy into the material during the laser operation, e.g., the welding process. By better coupling the laser energy to the material being welded, the chance of a run away process, which typically can occur with the infrared lasers (e.g., wavelengths greater than 700 nm) is greatly reduced and preferably eliminated. Better coupling of the laser energy also allows for lower power laser to be used, which provides cost savings. Better coupling also provides for greater control, higher tolerances and thus greater reproducibility of welds. These features, which are not found in with IR lasers and IR laser welding operations, are important, to among other products, products in the electronics and power storage fields.

In a preferred embodiment the blue laser has a wavelength of about 440 nm.

In an embodiment a blue laser that operates in a CW mode is used. CW operation can be preferred over pulsed lasers, in many applications, because of the ability to rapidly and fully modulate the laser output and control the welding process in a feedback loop, resulting in a highly repeatable process with optimum mechanical and electrical characteristics.

In general embodiment of the present inventions involve the laser processing of one, two or more components. The components may be made from any type of material that absorbs the laser beam, e.g., the laser beams energy, plastics, metals, composites, amorphous materials, crystalline materials and other types of materials. In an embodiment the laser processing involves the soldering together of two metal components. In an embodiment the laser processing involves the welding together of two metal components.

For example, the components may be a stack of foils. Thus, embodiments of the present systems and methods can weld, for example, stacks of 5 foils, stacks of 10 foils, stacks of 20 foils, stacks of 25 foils, stacks of 30 foils, stacks of 40 foils, and more or less, and from 10 foils to 40 foils. These stacks of foils can have a height of 5 µm or more, 10 µm or more, and 15 µm or more and from about 5 µm to about 10 µm. The foils in the stack are typically metal, and can be for example copper, and further, copper that has been coated with a lithium material. These foil stacks can be joined together by embodiments of the present systems and methods to form a cell.

Embodiments of the present systems and methods can be used to weld solar cell interconnect materials, which can, for example, be made from: 1100 aluminum; OFC ¼ hard copper; Cu/Invar/Cu cladded material; Cu/SS/Cu material; and combinations and variations of these.

In an embodiment there is provided the tools, systems and methods wherein the laser welding operation is selected from the group consisting autogenous welding, laser-hybrid welding, keyhole welding, lap welding, filet welding, butt welding and non-autogenous welding.

Laser welding techniques may be useful in many varied situations, and in particular where welding is needed for forming electron connections, and in particular power storage devices. Generally, embodiments of the present laser welding operations and systems include visible wavelength, and preferably blue wavelength, lasers that can be autogenous which means only the base material is used and is common in keyhole welding, lap welding, filet welding and butt welding. Laser welding can be non-autogenous where a filler material is added to the melt puddle to "fill" the gap or to create a raised bead for strength in the weld. Laser welding techniques would also include laser material deposition ("LMD").

Embodiments of the present laser welding operations and systems include visible wavelength, and preferably blue wavelength, lasers that can be hybrid welding where electrical current is used in conjunction with a laser beam to provide more rapid feed of filler material. Laser Hybrid welding is by definition non-autogenous.

Preferably, in some embodiments active weld monitors, e.g., cameras, can be used to check the quality of the weld on the fly. These monitors can include for example x-ray inspection and ultrasonic inspection systems. Furthermore, on stream beam analysis and power monitoring can be utilized to have full understanding of system characteristics and the operations characterizations.

Embodiments of the present laser systems can be a hybrid system that combine the novel laser systems and methods with conventional milling and machining equipment. In this manner material can be added and removed during the manufacturing, building, refinishing or other process. Examples of such hybrid systems, using other embodiments of laser systems, which have been invented by one or more of the present inventors, is disclosed and taught in U.S. patent application Ser. No. 14/837,782, the entire disclosure of which is incorporated herein by reference.

Typically seam trackers are beneficial, and at times often needed, when performing lap or butt welds. Keyhole welds that are also butt welds typically require a seam tracker, however Keyhole welds that penetrate both parts in a lap geometry generally do not need to track a seam.

Typically, in embodiments, laser welding uses a very low flow of gas to keep the optics clean, an air knife to keep the optics clean or an inert environment to keep the optics clean. Laser welding can be performed in air, an inert environment, or other controlled environment, e.g., $N_2$.

Figure 2:
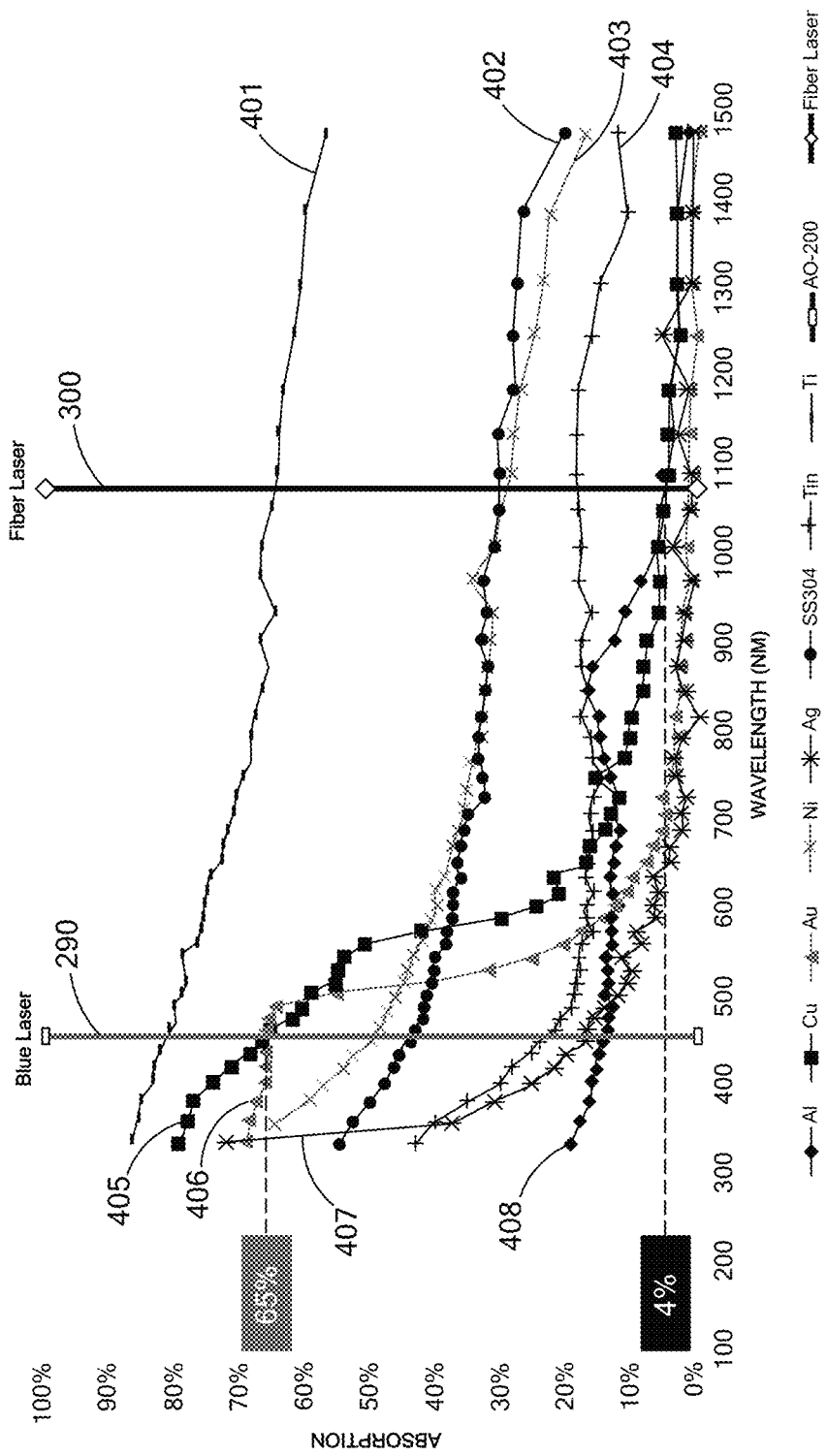
FIG. 2 is a graph comparing the enhanced absorption of laser energy by materials in accordance with the present inventions compared to the poor absorption of laser energy under the prior systems.
Figure 4:
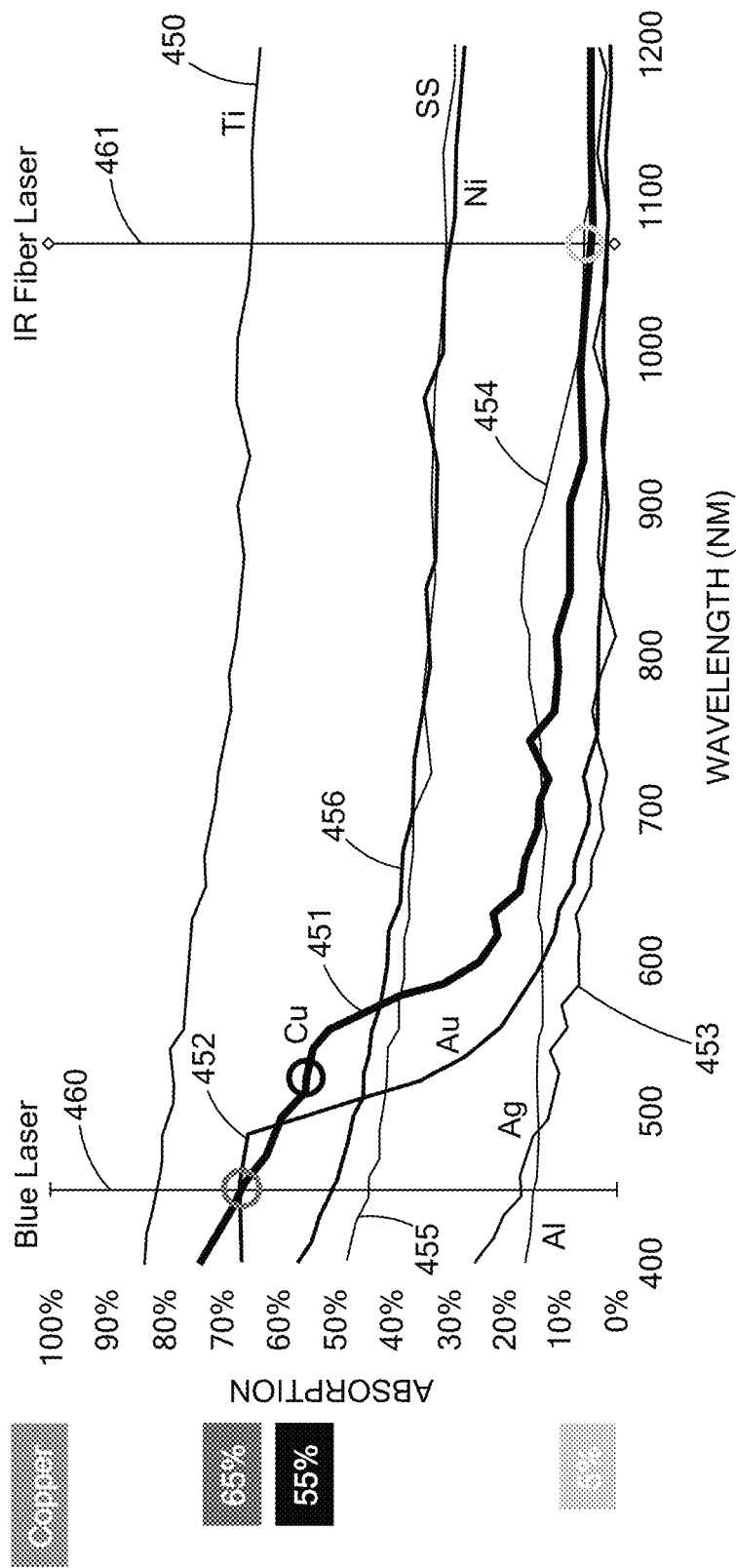
FIG. 4 is a graph showing the wave length dependent energy absorption by metal as utilized in embodiments in accordance with the present inventions.

An embodiment utilizes a blue laser that operates in the regime of 405 nm to 500 nm and is either multi-mode or single mode can be the source of blue light that is used to implement the welding process. FIG. 2 illustrates the absorption characteristics of the blue laser light compared to the infrared. Here it can clearly be seen that the blue light, nominally 450 nm (line 290), has a higher absorption characteristic than the infrared (line 200). In FIG. 2 the absorption vs the wavelength in nm at 295K (21.85 C) for Ti (line 401), SS 304 (line 402), Ni (Line 403), Sn (Tin) (line 404), Cu (line 405), Au (line 406), Ag (line 407), Al (line 408), Taking copper as an example, the difference in absorption from the infrared (4%) to the blue wavelength (65%) is a factor of 16× better absorption at the start of the welding process. This improvement in the absorption makes it possible to initiate and sustain the weld with a relatively low power/low brightness laser source in the blue enabling greater control during the welding process. In FIG. 4 additional absorptions for wavelength are provided showing Ti (line 450), Cu (line 451), Au (line 452), Ag (line 453), Al (line 454) Ni (line 456) and SS (line 455). An embodiment of a weld process using the wave length of 450 nm is shown by line 460 and it can be seen that the absorptions are better, and significantly better, e.g., Cu, Au, for many of the materials at the wavelength of this embodiment 460 compared to the abortions at IR wavelengths 461.

Embodiments of the present invention can find great advantage in welding copper based materials, which would include copper, pure copper, alloys of copper and all materials having sufficient amounts of copper to have at about a 40% to 75% absorption in the blue laser wavelengths, and preferably about 400 nm to about 500 nm.

Turning to FIG. 1 there is provided a schematic perspective view of an embodiment of a power storage device 100.

This embodiment has a group of batteries 101, 102, 103, 104 that are connected by a buss bar 105. The batteries are connected to the buss bar at weld areas 115, 114, 113, 112, 111, 110, 109, 108. It being understood that the actual laser weld, using preferably a blue laser, can be underneath the buss bar and thus not seen in the view of FIG. 1, can be at different positions within the thickness of the buss bar, and can be at different locations along the width of the buss bar (as see for example between 115 and 114). The buss bar 105 has a connector 106, which for example could connect to other battery packs, power cables or other devices. A weld 107, using a blue laser, attaches the buss bar 105 to connector 106. The welds that are formed in weld area are strong mechanical and electrical connections, these weld areas and their associated welds, have low resistivity: preferably lower than 140 mΩ); lower than 10 mΩ); and lower than 1 mΩ and from about 140 mΩ) to about 1 mΩ), about 100 mΩ) to about 50 mΩ), and about 100 mΩ) to about 10 mΩ), and about 10 mΩ) to about 1 mΩ.

There are two fundamental autogenous welds that can be performed with a laser beam, a conduction weld and a keyhole weld. The conduction weld is when a laser beam with a low intensity (<100 kW/cm$^2$) is used to weld two pieces of metal together. Here the two pieces of metal may be butted up to each other, overlapping to one side and completely overlapping. The conduction weld tends not to penetrate as deeply as a keyhole weld and it generally produces a characteristic "v" shape weld joint for a butt weld, which is very strong. However, a keyhole weld occurs with a relatively high laser beam intensity (>500 kW/cm$^2$) and this weld can penetrate deep into the material and often through multiple layers of materials when they are overlapped. The exact threshold for the transition from conduction mode to key-hole mode has not yet been determined for a blue laser source, but the key-hole weld has a characteristic "v" shape at the top of the material with a near parallel channel of refrozen material penetrating deep into the material. The key-hole process relies on the reflection of the laser beam from the sides of the molten pool of metal to transmit the laser energy deep into the material. While these types of welds can be performed with any laser, it is expected that the blue laser will have a substantially lower threshold for initiating both of these types of welds than an infrared laser.

Figure 3:
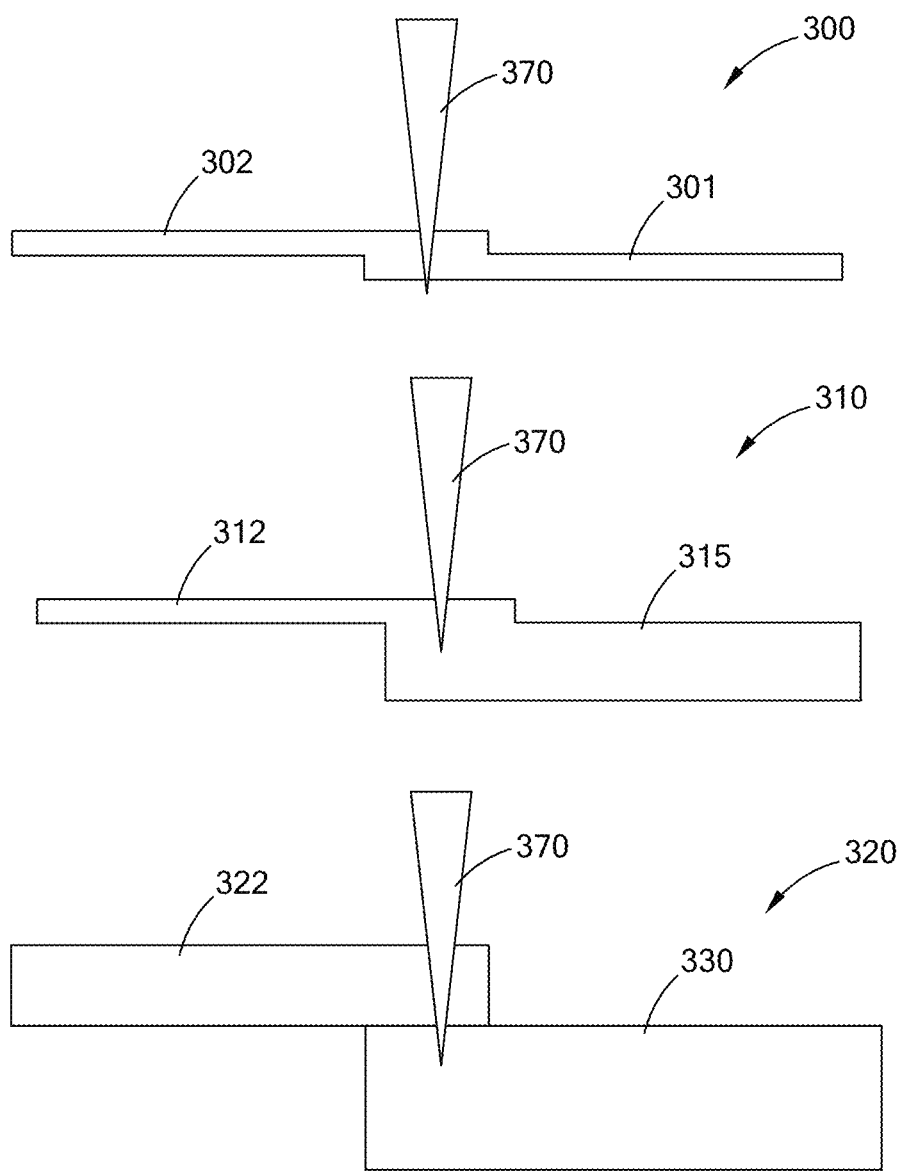
FIG. 3 is a schematic of and embodiment of blue laser welding of thin materials to thick materials in accordance with the present inventions.

Thus, turning to FIG. 3 there is shown a schematic of the welding together of storage device components using the methods of the present inventions. Thus, in configuration 300 there is shown the welding together of a Cu foil 301 to a Cu foil 32 using a blue laser beam 370, having a wavelength of 450 nm. In configuration 310 there is shown the welding together of a Cu Foil 312 to a Cu tab 315 using the laser beam 370. In configuration 320 there is shown a Cu tab 322 to an Al bus 330 using the laser beam 370.

There are a number of different types of connections that can be made in an energy storage system. Table 1 summarizes embodiments of a variety of bonds and the types of materials that can be bonded to build energy storage devices and preferably high efficiency energy storage systems. The present laser operations and systems can make quality welds, when the substrates are thin materials, (e.g., less than 100 μm, less than 50 μm, less than 25 μm, and less than 10 μm, and from about 100 μm to about 5 μm, from about 50 μm to about 5 μm, from about 76 μm to about 10 μm, and from about 50 μm to about 10 μm) and can make quality welds for thick materials (e.g., about 0.5 mm, about 1 mm and thicker).

TABLE 1

Table 1 Weld Configurations

| | Cu Foil | Al Foil | Cu Tab | Al Tab | Ni Tab | Cu Bus | Ni Bus | Al Bus |
|---|---|---|---|---|---|---|---|---|
| Cu Foil | X | | X | X | X | | | |
| Al Foil | | X | | | | | | |
| Cu Tab | | | X | | | X | X | X |
| Al Tab | | | X | X | | X | X | X |
| Ni Tab | | | | | X | | X | X |
| SS Foil | X | X | X | X | X | X | X | X |
| SS Tab | | | X | X | X | X | X | X |

Table 1 is set up with the top material in the weld is listed on the left column and the bottom material in the weld is listed along the top row. Thus, embodiments of different weld configurations are shown with an X in the table, which for example, shows a Cu Foil (top) welded to a Cu Foil (bottom) and an Al tab on top welded to a Cu Foil on bottom.

Bonding thin materials to each other can be a very different operation and present different problems than bonding thin materials to thick materials. One of the fundamental problems, with this type of welding, is the heat absorption and diffusion between the bonding layers and the ability to penetrate the top thin layer while bonding to the lower thicker layer. Embodiments of the present systems and operations and in particular embodiments of the blue laser systems and operations, makes it feasible to efficiently couple the laser energy into the thin layer, whether it be copper, aluminum, nickel plated copper, stainless steel, with sufficient efficiency to initiate a keyhole weld through the top layer of the thin material. Turning to FIG. 3 there is a schematic of an embodiment of a blue laser system and operation to weld a thin material to a thick material.

Laser that can be used with the present systems and for the present operations include lasers coming within the parameters of Table 2, for example.

TABLE 2

Table 2 Laser Configuration

| | Conduction Mode Weld | Key-Hole Mode Weld |
|---|---|---|
| Laser Requirements | | |
| Laser Wavelength (nm) | 450 | 450 |
| CW Laser Power (W) | 200 | 200 |
| Laser Spot Size (um) | 505 | 226 |
| Laser Intensity (W/cm2) | 100,000 | 500,000 |
| Modulation Rate | 500 Hz | 500 Hz |
| Nuburu AO-200 Laser | | |
| Laser Wavelength (nm) | 450 | 450 |
| CW Laser Power (W) | 200 | 200 |
| Laser Spot Size (um) | 505 | 150 |
| Laser Intensity (W/cm2) | 100,000 | 1,131,768 |
| Modulation Rate | 500 Hz | 500 Hz |

Further, the laser systems, and lasers of disclosed and taught in Ser. No. 14/787,393 (Devices, Systems and Methods for Three-Dimensional Printing), Ser. No. 14/837,782 (Applications, Methods and Systems for Materials Processing with Visible Raman Laser) and 62/193,047 (Applications, Methods and Systems for a Laser Deliver Addressable Array) the entire disclosure of each of which is incorporated herein by reference can be used for making the embodiments of the welds and embodiments of the present components and connectors, as well as, other embodiments of the present inventions.

In an embodiment a blue laser is used to weld metal.

In an embodiment a blue laser, having a wavelength between 400 nm and 500 nm is used to weld materials together, such as a foil to a foil where a foil is <100 μm in thickness, a copper or copper alloy foil to a copper or copper alloy foil, an aluminum or aluminum alloy foil to a copper or copper alloy foil, an aluminum or aluminum alloy foil to an aluminum or aluminum alloy foil, a foil to a tab which has a thickness that is >10 μm but <50 μm, a copper or a copper alloy foil to a copper or copper alloy tab, a copper or copper alloy foil to an aluminum or aluminum alloy tab, an aluminum or aluminum alloy foil to a copper or copper alloy tab, an aluminum or aluminum alloy foil to an aluminum or aluminum alloy tab, a nickel plated material such as copper or aluminum and their alloys, a stainless steel foil to a copper or a copper alloy tab, a stainless steel foil to an aluminum or an aluminum alloy tab, a tab to a buss bar which has a thickness of >100 μm but <1 mm, a copper or copper alloy tab to a copper or copper alloy buss bar, a copper or copper alloy tab to an aluminum or aluminum alloy buss bar, a copper or copper alloy tab to a nickel plated copper or copper alloy buss bar, a copper or copper alloy tab to a nickel plated aluminum or aluminum alloy buss bar, an aluminum or aluminum alloy tab to a copper or copper alloy buss bar, an aluminum tab to an aluminum buss bar, an aluminum or aluminum alloy tab to a nickel plated copper or copper alloy buss bar, an aluminum or aluminum alloy tab to a nickel plated aluminum or aluminum alloy buss bar, a stainless steel tab to a copper or copper alloy buss bar, a stainless steel tab to an aluminum or aluminum alloy buss bar, stainless steel to a nickel plated copper or copper alloy buss bar, stainless steel to a nickel plated aluminum or aluminum alloy buss bar, n copper or copper alloy foils where n>2, n aluminum or aluminum alloy foils where n>2, n stainless steel foils where n>2.

The welding of electroplated material using blue laser operations to weld these materials is contemplated, including the blue laser welding of electroplated materials, such as materials electroplated with copper, electroplated with platinum, and electroplated with other conductive material.

The following examples are provided to illustrate various embodiments of the present laser systems and operations and in particular a blue laser system for welding components, including components in electronic storage devices. These examples are for illustrative purposes and should not be viewed as, and do not otherwise limit the scope of the present inventions.

Example 1

A blue laser welding system consists of a laser, a motion system, a welding head, an inert gas feed system (which could be an air knife, or other controlled air delivery system, and which could also be incorporated into the welding head), a weld quality monitoring system and a clamping system. The laser delivers the power to the welding head via an optical fiber. The welding head collimates and refocuses the laser beam onto the parts to be welded. A motion system such as a 6-axis robot or simple two axis gantry system can be used to move the laser head at a precise distance above the workpiece and in a precise pattern. The height of the welding head from the workpiece is critical to keep the laser beam focused on the weld seam. A typical welding head, such as will be used with this blue laser system will have a final focusing length lens of 100 mm with a +/−200 μm height tolerance to maintain a good weld bead. In this configuration the laser/welding system will be capable of operating in a key-hole welding mode. With a longer focal length lens, 200 mm, with a +/−400 μm height tolerance, the laser system will be capable of welding in a conduction mode regime. As the laser beam is moved across the workpiece the laser power is varied from 0-100% in a continuous fashion in response to a weld quality sensor. The sensor constantly measures the width of the weld as a means of controlling the quality of the weld. The inert gas system is necessary when welding to prevent oxidation of the material being welding. The main criteria for the inert gas is that it shields the weld puddle from oxygen. Gases such as Helium, Argon, Argon/CO2, Argon/Hydrogen, or Nitrogen are commonly used. Argon and or Argon/CO2 is preferred because it is heavier than air and does an excellent job of settling around the part creating an oxygen free zone. Assist gas can be delivered in a variety of different ways. Prior to the weld, after weld, above sample being welded, below sample being weld, directly into weld, or any combinations of these delivery options. The clamping system is the next most important part of the welding system. The clamps may be actuated by tightening a series of bolts or screws, by magnetic hold downs, or by pneumatic hold downs. These clamping systems are common to all laser welding systems, and this system will incorporate them as well to insure a strong clamping force on the two or more pieces to be welded by the laser beam. In some cases, a roller wheel has been used to apply this clamping force as well as a slide. Other cases, individual clamps on each side of sample piece and/or plate with slot have been used to hold sample firm to fixture. Another consideration is the case when the weld is not autogenous, and requires material to be added to the weld joint. This can be accomplished with either a wire feeder or a powder feeder. Most cases of welding requiring a filler will use a wire. Finally, the combination of this laser with other lasers or an arc will enable deeper penetration welds in all weldable materials. The parts to be welded can be moved to the clamping fixture by either a human, or a robot. Both methods are used today in production scenarios.

Example 2

In an embodiment a blue laser capable of sufficient intensity (>500 kW/cm$^2$) to initiate and sustain a keyhole weld through materials used in fabricating a battery is employed.

Example 3

Embodiments of the present systems are used to join, e.g., weld, solar cell interconnect materials that may be 1100 aluminum, OFC ¼ hard copper, Cu/Invar/Cu cladded material, or Cu/SS/Cu material.

Example 4

A blue laser welding system for welding metals has a blue laser source, an optics assembly for focusing the laser beam and providing z-direction movement if needed, and an x-y scanner, for moving the beam along, or positioning the beam on the point where the weld is to be made. These components are preferably in control communication with a control system which can be for example a computer, a controller, and both.

Figure 5:
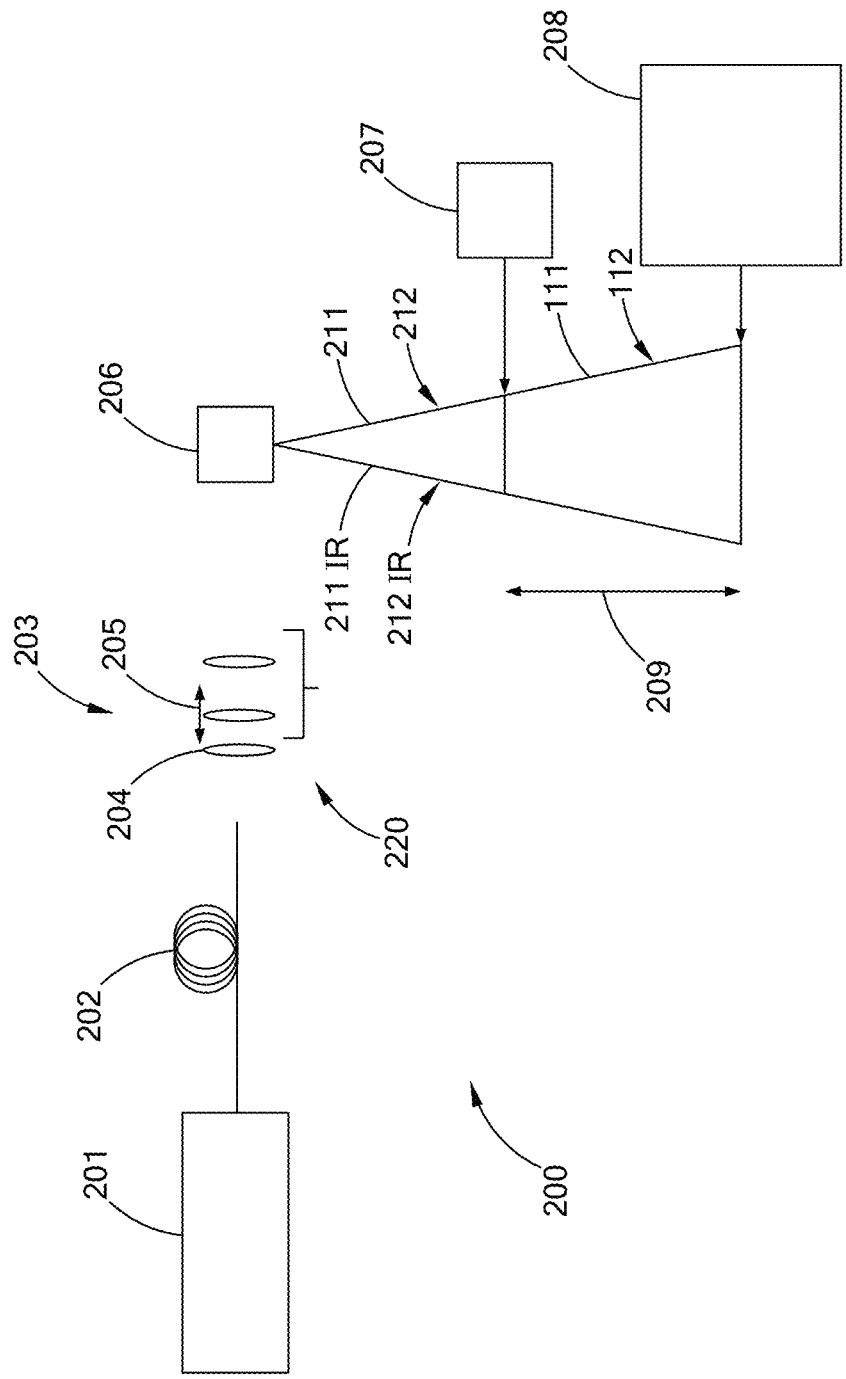
FIG. 5 is a schematic of a blue laser system for performing embodiments of the welding methods in accordance with the present inventions

For example turning to FIG. 5, there is shown a schematic flow diagram of an embodiment of a blue laser system for performing the methods of the present invention. U.S. Pat. No. 11,980,970 filed contemptuously with the present application, discloses and teaches embodiment of laser systems that can be used to perform the embodiment of the present welding methods, the entirely of which is incorporated herein by reference. FIG. 5 also shows a comparison between the scanning volume achievable with a blue laser system compared to an infrared laser system when the spot size is the same for both systems. Thus, in the system 200, there is a laser system 201 for propagating a blue laser beam. The laser system 201 is in optical communication with an optical fiber 202 for delivery of the laser beam to the optical delivery assembly 203. In this manner the fiber optic 202 places the laser system 201 in optical communication with the optical delivery assembly 203. The optical delivery assembly 203 has a collimating optic 204, and a movable optic 205. The system 200 has an x-y scanning system 206. the laser beam and laser beam path leaves the x-y scanner and is in free space and travels or is directed toward the target, e.g., the part to be welded. The blue laser system 200 produces a footprint of scanable area 208, e.g., the area where the laser beam can be directed to perform the welding operation on the piece that are to be welded together. In FIG. 5, for comparison purposes, there is shown an IR system scanable area 207, that would be obtained using the same spot size as the blue laser system 200. In this figure the IR laser beam path 211 IR, and IR laser beam 212 IR are super imposed over (for comparison purposes) the blue laser beam path 211 and the blue laser beam 212. Thus, the scanable area 208 for the blue laser system is twice as large as the scanable area 207 for the IR laser system, with both systems having the same spot size. Arrow 209 illustrates that the blue laser system produces the same spot size as the IR system, but at a distance that is over twice as far away from the focusing lens. In this manner the blue laser system not only has the advantage of higher absorption that the IR system, has the ability to weld larger pieces, more piece, or both in the same size (e.g., foot print) system.

The focusing lens system 220 resembles a zoom optic in that the central lens may be either a positive or negative component that is physically moved at a rapid speed to adjust the focal length of the lens system. This focusing of the beam is synchronized with the scanning of laser beam by the X-Y scanning system to simulate flat field characteristic of a laser beam scanning through an F-Theta lens system. Thus, focusing system 220 and scanner 206 are in synchronized and in control communication with a controller or control system on the system 200. This requires the electronically controlled focusing element to be sufficiently fast to keep up with the X-Y scanning, which is achievable with high speed servo systems.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and with existing equipment or activities which may be modified, in-part, based on the teachings of this specification. Further, the various embodiments set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

The invention claimed is:

1. A method of joining two metal components, using a blue laser beam, the method comprising:
   a. providing a source of a blue laser beam having a predetermined wavelength to a target location, the target location including a first component to be joined and a second component to be joined;
   b. providing a scanning device and focusing optics configured to deliver the blue laser beam in a pattern and at a predetermined laser intensity to the target location, wherein the predetermined laser intensity defines a laser beam energy;
   c. the blue laser beam and at least one of the first or second components having an absorptivity that is at least about 45%;
   d. delivering the blue laser beam in the pattern and the predetermined laser intensity to the target location to weld the first and second components together; thereby forming a weld between the first and second components; wherein at least 45% of the laser beam energy is utilized to form the weld; and,
   e. wherein the weld has a resistivity of about 0.1 m$\Omega$ to about 250 m$\Omega$.

2. The method of claim 1, wherein the resistivity is from about 0.1 m$\Omega$ to about 200 m$\Omega$.

3. The method of claim 1, wherein the resistivity is less than about 150 m$\Omega$.

4. The method of claim 1, wherein the resistivity is less than about 100 m$\Omega$.

5. The method of claim 1, wherein the resistivity is less than about 10 m$\Omega$.

6. The method of claim 1, wherein the resistivity is less than about 1 m$\Omega$.

7. The method of claim 1, wherein the scanning device moves the laser beam.

8. The method of claim 1, wherein the scanning device moves the first and second components.

9. The method of claim 1, wherein the power per area of the laser beam at the spot on the first, the second, or both components is less than about 1,000,000 W/cm$^2$.

10. The method of claim 1, wherein the power per area of the laser beam at the spot on the first, the second, or both components is less than about 500,000 W/cm$^2$.

11. The method of claim 1, wherein the power per area of the laser beam at the spot on the first, the second, or both components is less than about 100,000 W/cm².

12. The method of claim 1, wherein the power per area of the laser beam at the spot on the first, the second or both components is less than about 50,000 W/cm².

13. The method of claims 1, 5, 6, 8, 9 or 10, wherein the wavelength is about 450 nm.

14. The method of claim 1, wherein the first component and the second component are different metals.

15. The method of claim 1, wherein the first component and the second component are the same metal.

16. The method of claim 1, wherein the first component is selected from the group consisting of gold, copper, silver, aluminum, steel, stainless steel, and alloys of one or more of those metals.

17. A method of joining two metal components, using a blue laser beam, wherein the laser intensity at a weld site does not need to be appreciably changed, the method comprising:
  a. providing a source of a blue laser beam having a predetermined wavelength to a weld site, the weld site including a first component to be joined and a second component to be joined;
  b. providing a scanner and a focusing optics in optical association with the source of the blue laser beam;
  c. the source of the blue laser beam, the scanner and the focusing optics delivering the blue laser beam in a pattern and at a predetermined laser intensity to the weld site including the first and the second components; thereby welding the first and second components together, thereby forming a weld between the first and second components; wherein the predetermined laser intensity defines a laser beam energy;
  d. wherein the blue laser beam consists essentially of the predetermined laser intensity from a start of the welding through a completion of the welding; and,
  e. wherein at least 45% of the blue laser beam energy is utilized to form the weld.

18. The method of claim 17, wherein about 50% of the laser beam energy is utilized to form the weld.

19. The method of claim 17, wherein about 60% of the laser beam energy is utilized to form the weld.

20. The method of claim 17, wherein about 65% of the laser beam energy is utilized to form the weld.

21. The method of claim 17, wherein during the welding of the components the laser beam intensity is capable of varying from about 1% to about 20% during the welding.

22. The method of claim 17, wherein during the welding of the components the laser beam intensity is capable of varying about 10% during the welding.

23. The method of claim 17, wherein during the welding of the components the laser beam intensity is capable of varying form about 1% to about 5% during the welding.

24. The method of claim 17, wherein during the welding of the components the laser beam intensity is capable of varying about 1% during the welding.

* * * * *